United States Patent
Komaki et al.

[11] Patent Number: 6,058,145
[45] Date of Patent: May 2, 2000

[54] METHOD OF DEMODULATING A MULTI-FREQUENCY QUADRATURE MODULATED SIGNAL

[75] Inventors: Shozo Komaki, Osaka; Minoru Okada, Minoo; Takeshi Kawabe, Kamagaya, all of Japan

[73] Assignee: Sharp Kabushiki Kaisha, Osaka, Japan

[21] Appl. No.: 08/988,934

[22] Filed: Dec. 11, 1997

[30] Foreign Application Priority Data

Dec. 24, 1996 [JP] Japan .................................. 8-343204

[51] Int. Cl.[7] .......................... H04L 27/14; H04L 27/06; H03D 3/00
[52] U.S. Cl. ........................... 375/324; 375/316; 329/315
[58] Field of Search ................................ 375/324, 316; 329/316, 315, 318, 327, 300; 370/342, 517

[56] References Cited

U.S. PATENT DOCUMENTS

| | | | |
|---|---|---|---|
| 5,602,835 | 2/1997 | Seki et al. | 370/206 |
| 5,608,764 | 3/1997 | Sugita et al. | 375/344 |
| 5,680,421 | 10/1997 | Shiino et al. | 375/368 |
| 5,694,389 | 12/1997 | Seki et al. | 370/208 |
| 5,734,647 | 3/1998 | Yoshida et al. | 370/335 |
| 5,774,561 | 6/1998 | Nakagawa et al. | 381/66 |

FOREIGN PATENT DOCUMENTS

07143097A   6/1995   Japan .

*Primary Examiner*—Chi H. Pham
*Assistant Examiner*—Khai Tran

[57] ABSTRACT

A multi-frequency quadrature modulated signal is divided into a plurality of frequency bands. Each frequency band component is estimated as to variation in phase due to multi-path phasing, using its guard interval waveform so as to compensate the variation.

9 Claims, 10 Drawing Sheets

METHOD OF DEMODULATING A MULTI-FREQUENCY QUADRATURE MODULATED SIGNAL

BACKGROUND OF THE INVENTION

1. Field of the Invention

The present invention relates to a demodulating method for multi-frequency quadrature modulation in digital wireless communications.

2. Description of the Background

A technique of multi-frequency quadrature modulation, which presents strong resistance to multipath distortion has been investigated in the fields of ground wave digital broadcasting, high-speed digital mobile wireless communications and subcarrier transmission. The technique of multi-frequency quadrature modulation is a method for transmission of digital data by frequency multiplexed transmission using a plurality of carrier wave frequencies which are distributed at intervals of the reciprocal of a symbol period.

Figure 1:
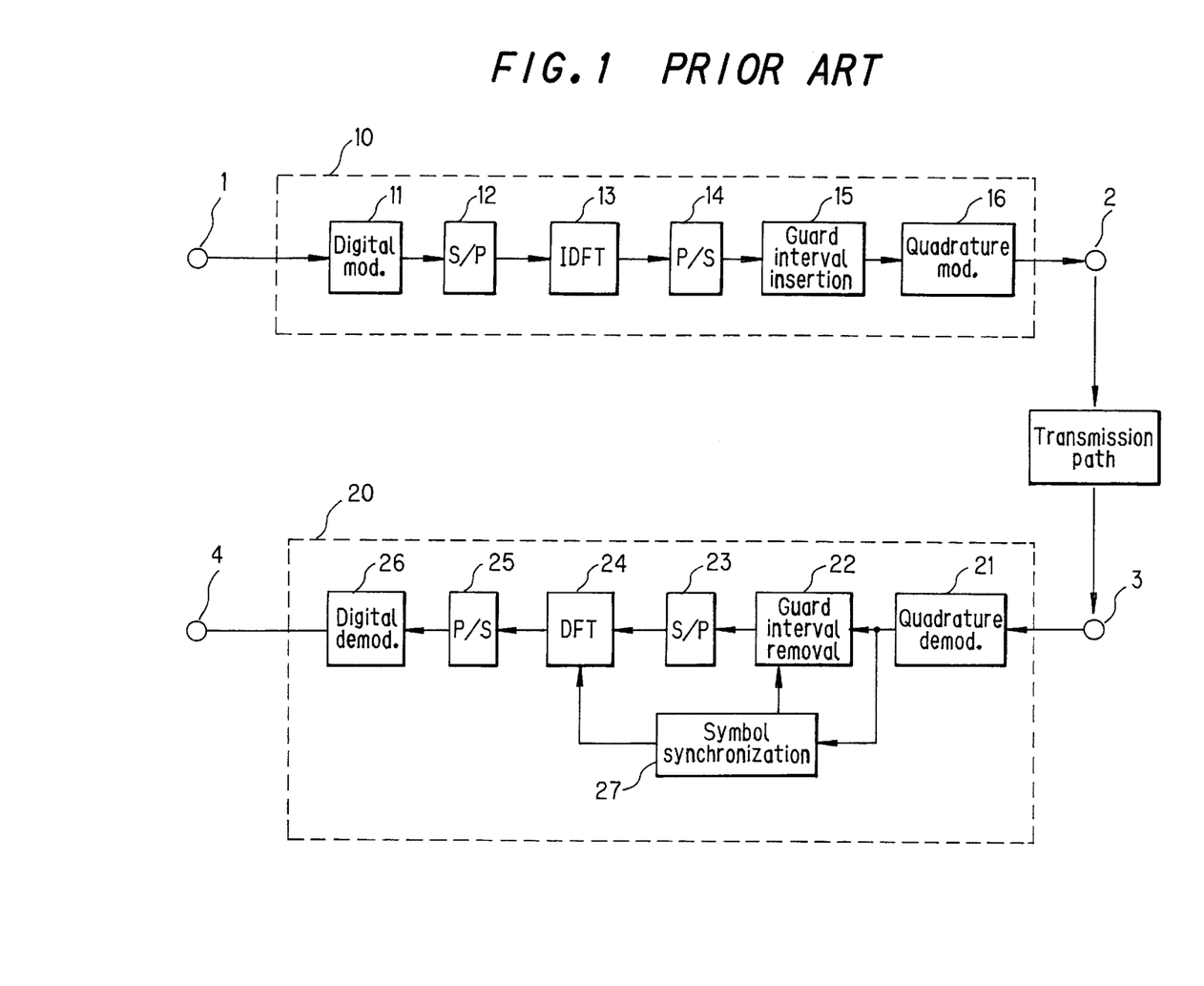
FIG. 1 is a block diagram showing conventional transmitter and receiver configurations using multi-carrier quadrature modulating method.

FIG. 1 shows a configuration for a conventional method of multi-frequency quadrature modulation. The operation of the conventional method of multi-frequency quadrature modulation will be described hereinbelow with reference to FIG. 1.

A binary digital signal input from an input terminal 1 in a transmitter 10 is processed in a digital modulator 11 where the input signal is phase modulated (modulated by PSK: phase shift keying) or quadrature amplitude modulated (modulated by QAM: quadrature amplitude modulation) so as to be converted into an equivalent low-band symbol of the signal.

The modulated symbol is input to a serial-to-parallel converter (S/P) 12 where it is converted into N number of symbol streams which each have a transmission rate 1/N as much as that of the input symbol stream. These streams are processed in an inverse discrete Fourier transformer (IDFT) 13 where the symbol streams are imprinted onto subcarriers having corresponding frequencies and composited to be output.

The output signal is a summation signal of a plurality of modulated signals which are distributed at intervals of the reciprocal of the symbol period. The output signal from IDFT 13 is converted into serial data by a parallel-to-serial converter 14. Guard intervals are inserted into the converted data by a guard interval inserting section 15.

The signal with guard intervals inserted therein is then quadrature modulated by a quadrature modulator 16, and the resultant signal is output from a modulated signal output terminal 2 so as to be transmitted.

A receiver 20 operates in the reverse order to that performed in transmitter 10 so as to interpret the transmitted data stream. First, the received signal is input from an input terminal 3 and is quadrature demodulated by a quadrature demodulator 21. The quadrature demodulated signal is stripped of the guard interval components through a guard interval remover 22.

A symbol synchronous signal is generated by a symbol synchronous signal generating circuit 27. The signal which has been stripped of guard intervals is converted into parallel data by a serial-to-parallel converting circuit 23. The converted data is input to a discrete Fourier transformer (DFT) 24. In DFT circuit 24, the received signal is separated into equivalent low-band signals each corresponding to a subchannel so as to be output as parallel data consisting of N symbols.

These symbols are converted into the original serial data by a parallel-to-serial converter (P/S) 25, and then subjected to a judgment by a digital demodulator 26 of whether they are of a PSK signal or QAM signal. The result is output from the received data output terminal.

Figure 2:
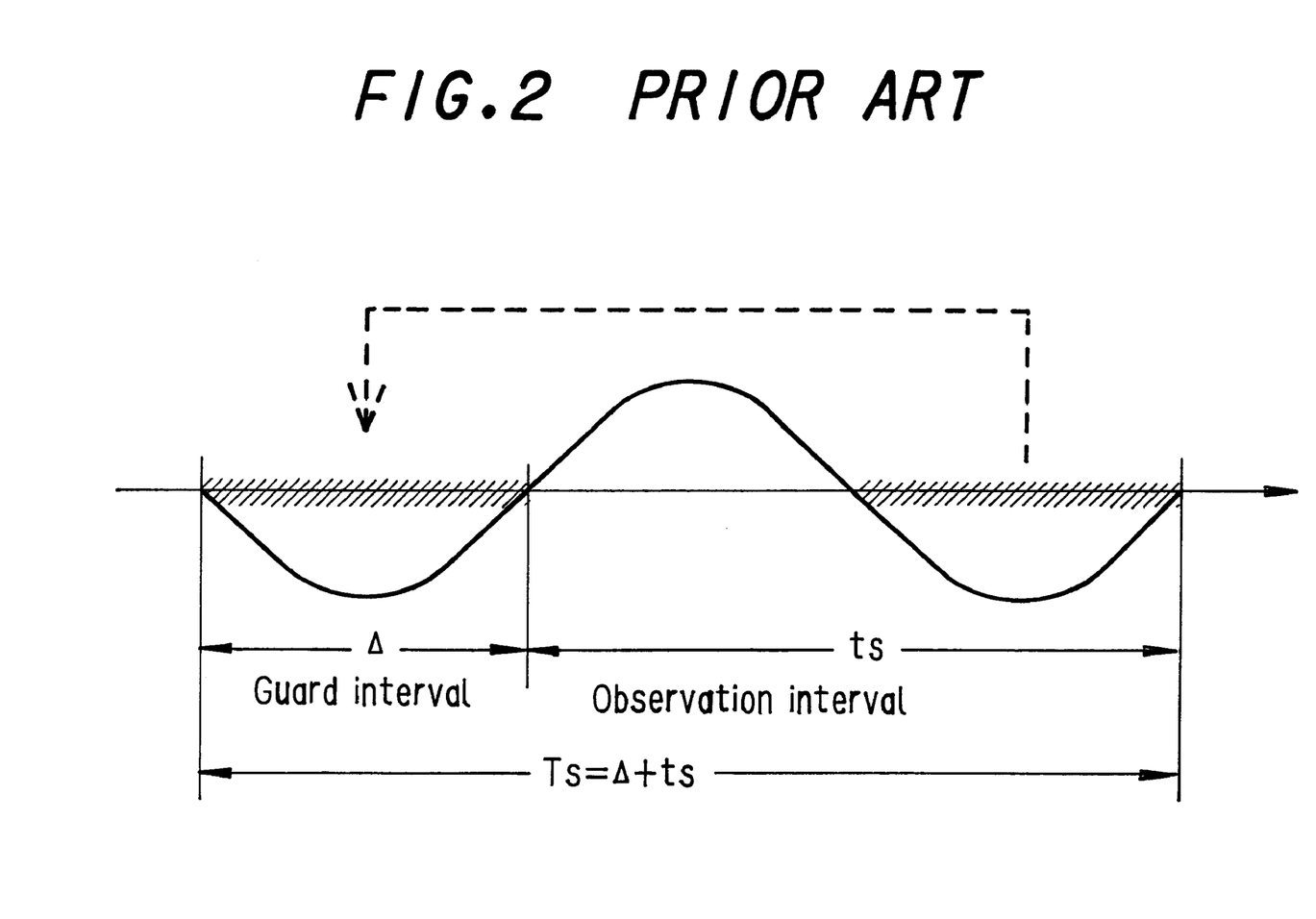
FIG. 2 is a signal waveform of a multi-carrier quadrature modulated signal.

In the multi-frequency quadrature modulating method, the transmission rate for each subchannel is low enough so that the signal will be little affected by delayed multi-pass waves. Further, guard intervals are provided in order to completely eliminate intra-code interference due to delayed waves. FIG. 2 shows an overall waveform of a modulated signal in the multi-frequency quadrature modulating method.

As understood from FIG. 2, the guard interval has the same waveform interposed as that in the rear end of the observation interval signal. The provision of the guard interval prevents interference due to delayed waves which have been delayed by the length of the guard interval or less, making it possible to inhibit degradation of transmission characteristics.

On the other hand, the multi-frequency quadrature modulation signal is markedly degraded in its transmission characteristics due to frequency offset between transmitting and receiving equipment and due to time-dependent variation in amplitude and phase caused by the propagation path.

Concerning the frequency offset and relatively slow time-dependent variations in phase, various frequency synchronizing methods have been investigated and their validity has been proved. However, the conventional methods need a very long time to establish frequency synchronization, so that they are not effective for high speed variations in phase.

In a multi-pass phasing propagation path, if transmission beyond the coherence band width is performed, time-dependent variation in amplitude and phase of a signal occurring within its transmission band differs from others for each frequency band range. Therefore, it is impossible for the conventional frequency synchronizing methods to compensate them.

Consequently, when a multi-frequency quadrature modulation signal which has undergone high-speed and frequency selective phasing is received, time-dependent variation in amplitude and phase caused by the propagation path needs to be corrected for each frequency band and then demodulated

SUMMARY OF THE INVENTION

It is therefore an object of the present invention to provide a method of receiving a multi-frequency quadrature modulated signal by compensating distortion due to high-speed and frequency selective phasing.

To achieve the above object, the present invention is configured as follows:

In accordance with the first aspect of the invention, a method of demodulating a multi-frequency quadrature modulated signal for transmitting data using frequency multiplex transmission using a plurality of frequencies, comprises:

- a frequency shift estimating means which receives a multi-frequency quadrature modulated signal and estimates the average frequency shift;
- a frequency shift compensating means which receives the frequency shift estimated by the frequency shift estimating means and compensates the frequency shift of the multi-frequency quadrature modulated signal;
- a band filter set for separating the multi-frequency quadrature modulated signal of which the frequency shift has been compensated by the frequency shift compensating means, into different frequency components;

a propagation path variation estimating means estimating the propagation path variation of each of the divided modulated signal components which have been obtained from the band filter set;

a propagation path variation compensating means which receives the propagation path variation estimated by the propagation path variation estimating means and compensates the propagation variation of each of the separated modulated signal components; and a decoding means receiving the output from the propagation path variation compensating means and decoding the multi-frequency quadrature modulated signal.

In accordance with the second aspect of the invention, the method of demodulating a multi-frequency quadrature modulated signal for transmitting data using frequency multiplex transmission using a plurality of frequencies, having the above first feature, further comprises:

a delaying means receiving the multi-frequency quadrature modulated signal and delaying the modulated signal;

a dividing means for estimating the time-dependent variation in amplitude and phase which has been caused when the modulated signal has passed through the communication path, by dividing the output signal from the delaying circuit by the input signal;

a smoothing means for smoothing the output signal from the dividing means; and a compensating means compensating the time-dependent variation in amplitude and phase of the received signal based on the estimated output signal obtained from the smoothing means.

In accordance with the third aspect of the invention, the method of demodulating a multi-frequency quadrature modulated signal for transmitting data using frequency multiplex transmission using a plurality of frequencies, having the above first feature, further comprises:

an interpolating means receiving the modulated signal and the estimated time-dependent variation of the modulated signal in amplitude and phase and determining the estimate of the time-dependent variation of amplitude and phase in a shorter interval by interpolation; and a compensating means compensating time-dependent distortion of the modulated signal by dividing the modulated signal by the estimate value determined by the interpolating means.

In the multi-frequency quadrature modulating method, since the transmission is performed by interposing the guard interval having the same waveform as that in the rear end of the observation interval, it is possible to estimate the rapid vibrations in amplitude and phase by comparing the two waveforms.

In the multi-frequency quadrature modulating method, even when the transmission band is divided into a plurality of frequency bands, it is possible to demodulate only the modulated signal on a subcarrier belonging to the separated band range.

In the present invention, noting this feature in the multi-frequency quadrature modulating method, the multi-frequency quadrature modulated signal is divided into a plurality of frequency bands, and the waveform in the guard interval is used for each frequency band to estimate and compensate the phase variation due to multi-pass phasing.

DESCRIPTION OF THE PREFERRED EMBODIMENTS

The embodiment of the invention will hereinafter be described with reference to the accompanying drawings.

Figure 3:
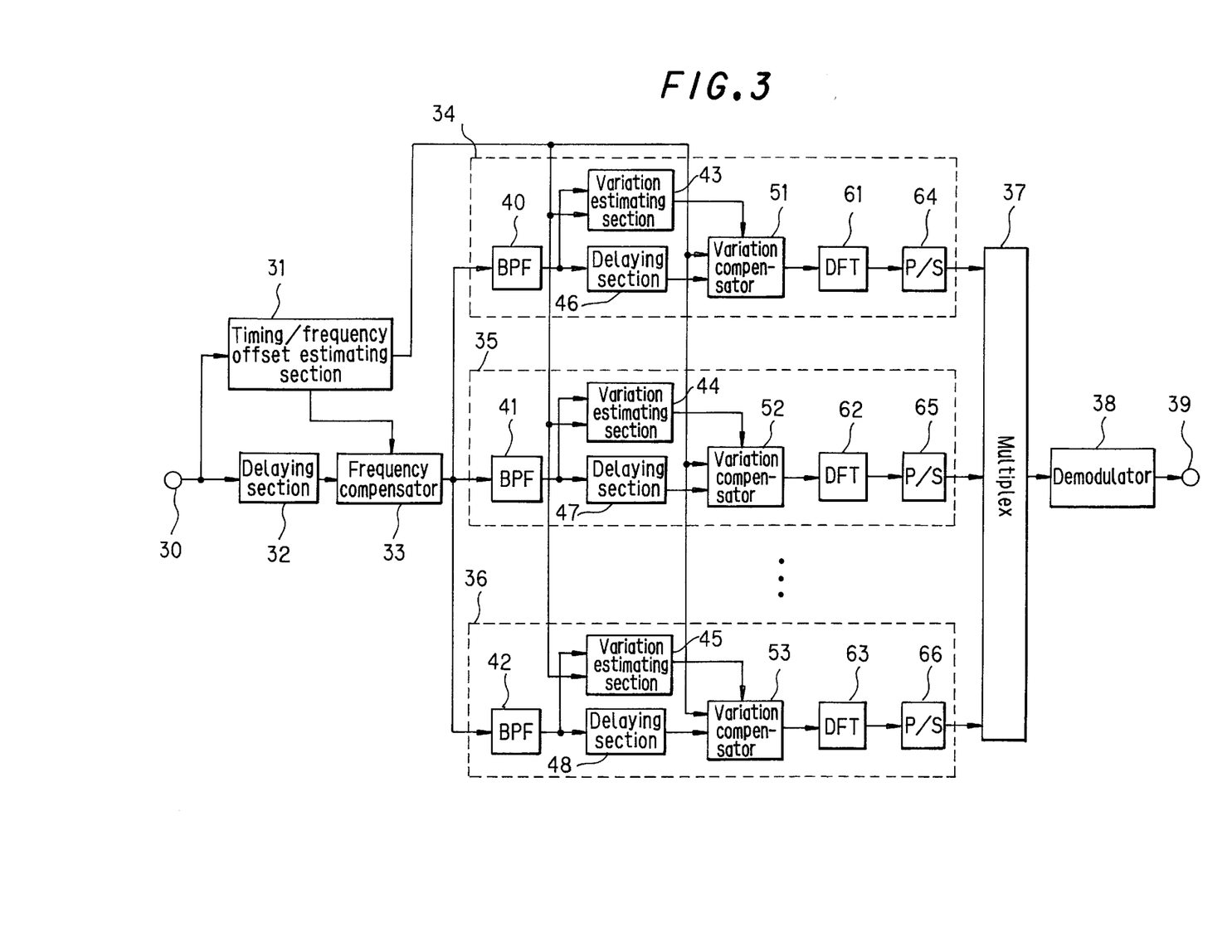
FIG. 3 is a block diagram showing a receiver configuration in the first embodiment of the invention.

FIG. 3 is a block diagram showing a receiver of the invention. In this figure, the received signal input being from input terminal 30 is supplied to a timing/frequency offset estimating section 31 and a delaying section 32.

Timing/frequency offset estimating section 31, estimates the symbol timing and the frequency offset. Delaying section 32 in FIG. 3 delays the received signal by the time required for the estimation of the timing and frequency offset to supply the signal to a frequency compensator 33.

Frequency compensator 33 compensates frequency offset based on the estimated frequency offset determined in timing/frequency offset estimating section 31.

The compensation of the frequency offset here is performed for only the offset of fixed frequency between the transmitter and receiver.

Figure 4:
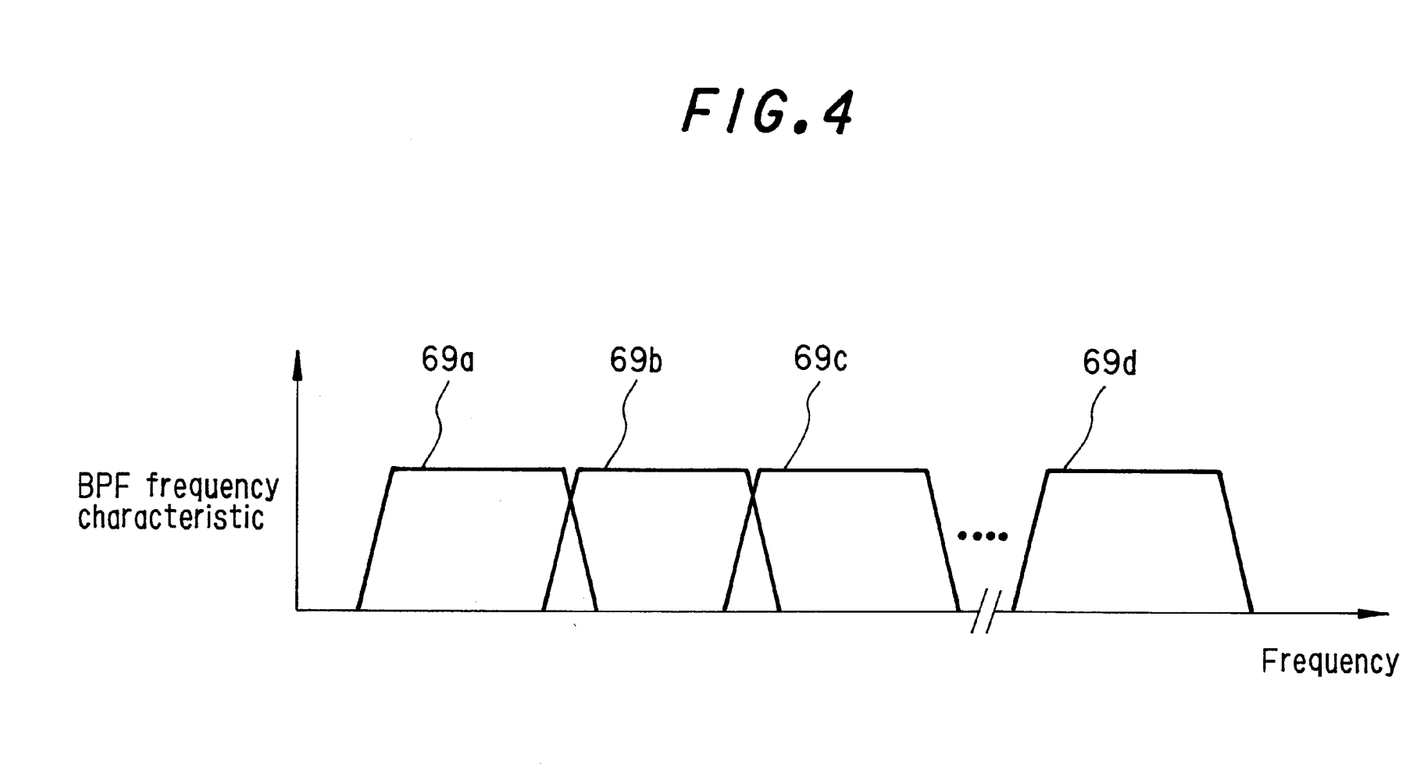
FIG. 4 is a characteristic chart showing overall shapes of the frequency characteristics of band-pass filters of 21 to 2n of FIG. 3.

The received signal after frequency offset compensation is input to n number of band-pass filters 40, 41 and 42 so that the signal is divided into band ranges of n parts. The frequency distribution characteristic of each band-pass filter is shown in FIG. 4.

The band of each band-pass filter is set around a level equal to or lower than the coherence band width of the propagation path. The divided signals are input to variation estimating sections 43, 44 and 45 as well as delaying sections 46, 47 and 48. The variation estimating section estimates time-dependent variations due to the phasing propagation path.

Each delaying section delays the signal by the time required for the estimation and inputs the signal to variation compensator 51, 52 and 53, respectively. Variation compensators 51, 52 and 53 compensate time-dependent variations in the signals based on the estimated variations due to the propagation path.

The compensated signals are supplied to discrete Fourier transformers 61, 62 and 63 respectively, where the signal is divided into subchannel signals. The subchannel signals are converted into serial data in parallel-to-serial converter 64, 65 and 66 and the converted data is then multiplexed in a multiplexing circuit 37.

The multiplexed signal obtained from multiplexing circuit 37 is determined and demodulated in a demodulator 38 so as to reproduce the transmitted data. The data stream is output from an output terminal 39.

Figure 5:
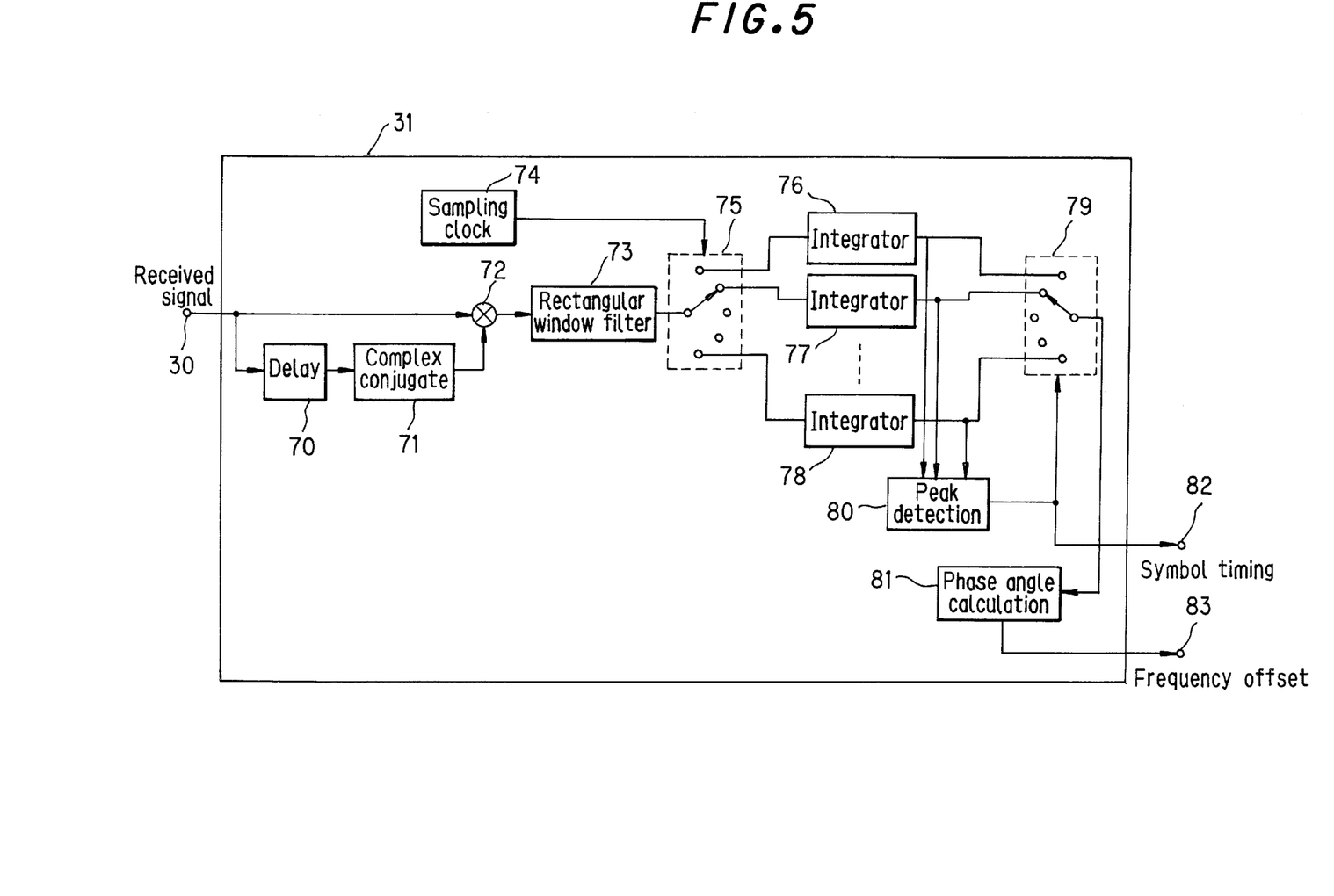
FIG. 5 is a block diagram showing a symbol timing/frequency offset estimating section of the invention.

Next, FIG. 5 is a block diagram showing the timing/frequency offset estimating section used in the above embodiment. In FIG. 5, the received signal being input from input terminal 30 is delayed by an observation time $t_s$ in a delaying section 70.

The output signal from delaying section 70 is supplied to a complex conjugate calculating section 71 where the complex conjugate signal is calculated. The output signal from complex conjugate calculating section 71 as well as the received signal being input from input terminal 30 is input to complex multiplier 72. The output signal from the multiplier is input to a rectangular window filter 73 having a rectangular impulse response of width A. The output from rectangular window filter 73 is supplied to a distributing switch 75.

The output signal from a sampling clock 74 is also input to distributing switch 75, where the output from rectangular filter 73 is distributed to n number of integrators 76, 77 and 78 based on the clock timing. Each integrator calculates the integral of the input signal taken across the M symbol intervals of the multi-frequency quadrature signal. By this calculation, a likelihood function represented by formula (1) is determined.

$$\Lambda(k) = \sum_{m=0}^{M-1} \int_{-\Delta}^{0} r^*(t + kt_{samp} + mT_s) r(t + t_s + kt_{samp} + mT_s) dt \quad (1)$$

Here, $t_{samp}$ represents a sampling period; $t_s$ an observation interval length; $\Delta$ a guard interval length; and Ts=ts+$\Delta$ represents a symbol length. Each integrator output is input to peak detector 80, where it is determined which integrator output has the greatest amplitude. The output from peak detector 80 is output from a symbol timing signal output terminal 82.

At the same time, this output is input to a selector switch 79 where the integrator having the greatest amplitude is selected from the integrators 76, 77 and 78 and the selected output is supplied to a phase angle calculating section 81. In phase angle calculating section 81, the phases of the output signals from integrators 76, 77 and 78 are calculated. The output signal from phase angle calculating section 81 is output from a frequency offset estimate value output terminal 83.

Figure 6:
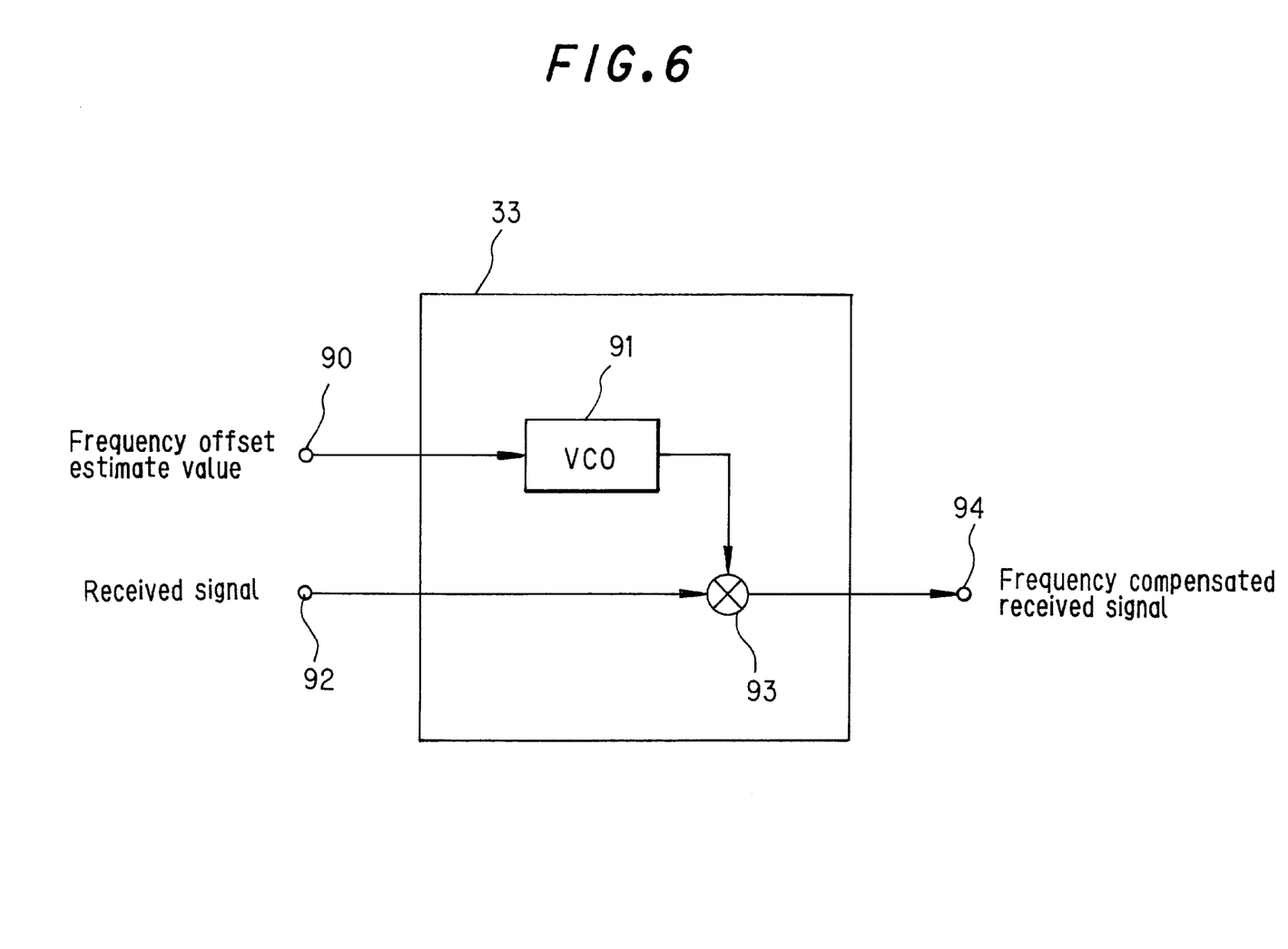
FIG. 6 is a block diagram showing a frequency offset compensator of the invention.

FIG. 6 shows the configuration of frequency offset compensator 33 used in this invention. In FIG. 6, the frequency offset estimate value is supplied from a frequency offset estimate value input terminal 90 to a voltage controlled oscillator 91, where a sinusoidal signal having a frequency in conformity with the frequency offset is generated.

The oscillator output signal and the received signal being input from a received signal input terminal 92 are input together to a multiplier 93. Multiplier 93 performs complex multiplication and compensates its frequency offset. The output from multiplier 93 is output from a frequency compensated received signal output terminal 94.

Figure 7:
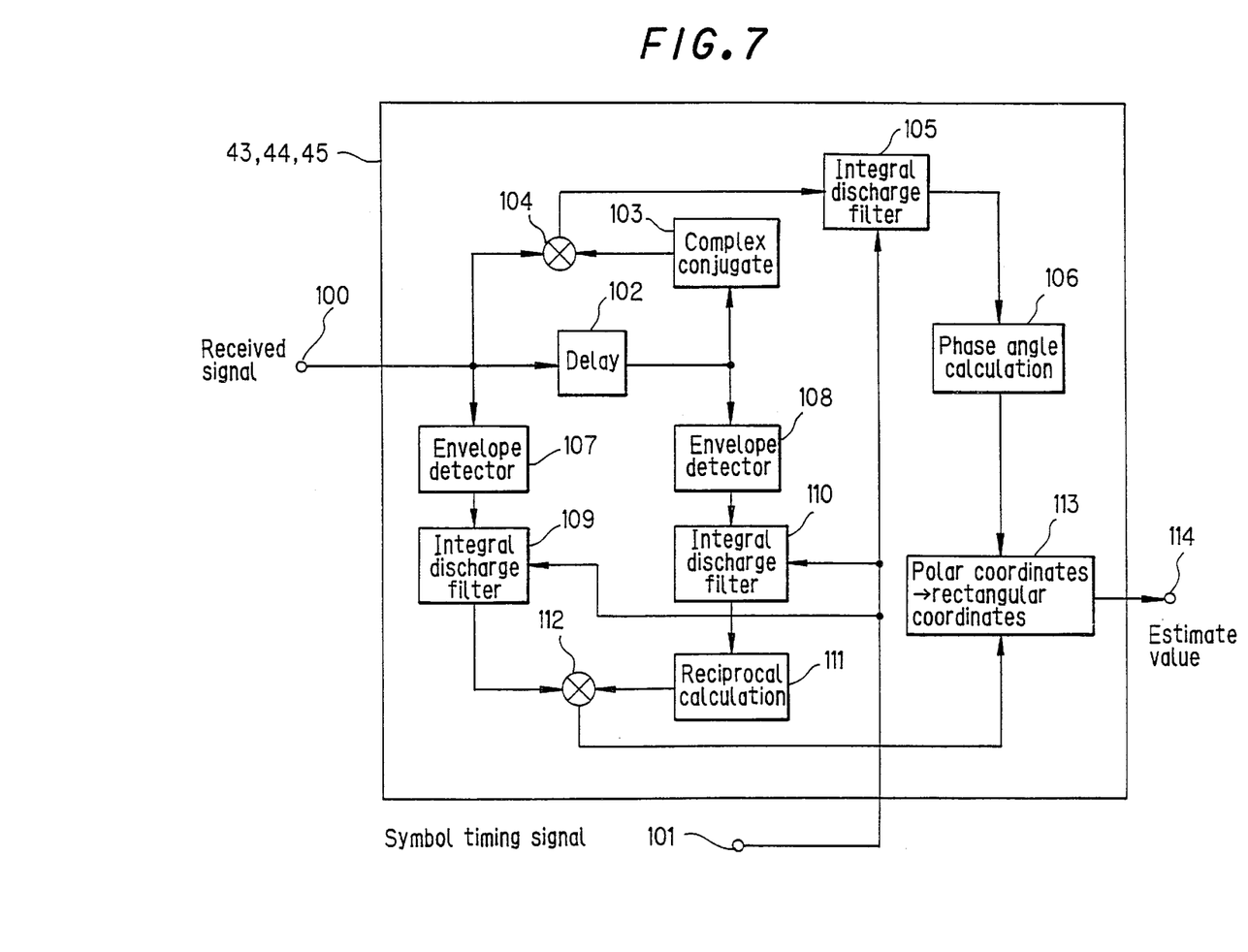
FIG. 7 is a block diagram showing the configuration of a propagation path variation estimator of the invention.

FIG. 7 shows the configuration of propagation path variation estimating sections 43, 44 and 45 used in this invention. In FIG. 7, the received signal being input from a received signal input terminal 100 is supplied to delaying section 102 where the signal is delayed by time $t_s$. The delaying section output is supplied to a complex conjugate calculating section 103 where its complex conjugate signal is calculated. The output signal from complex conjugate calculating section 103 is input together with the input signal from received signal input terminal 100 to a multiplier 104, and complex multiplication is perform.

The output from multiplier 104 is input to an integral discharge filter 105, where the integral of the output is calculated based on the symbol timing being input from a symbol timing signal input terminal 101. Further, the integral discharge filter output signal is supplied to a phase angle calculating section 106. The output signal from phase angle calculating section 106 is a variation in phase across one symbol interval shown in formula (2).

$$\phi = arg\left( \int_{-\Delta}^{0} r^*(t) r(t + t_s) dt \right) \quad (2)$$

The received signal being input from received signal input terminal 100 and the output from delaying section 102 are also supplied to envelope detectors 107 and 108 respectively, where the amplitude of the received signal is calculated.

The outputs from envelope detectors 107 and 108 are input to integral discharge filters 109 and 110 respectively, where the integral of the signal is calculated based on the symbol timing input from symbol timing signal input terminal 101. Further, the output from integral discharge filter 110 is supplied to a reciprocal calculating section 111, where the reciprocal is calculated. The output from integral discharge filter 109 and the output from reciprocal calculating section 111 are supplied to a multiplier 112.

The output from multiplier 112 is the estimate value of the variation ratio of the amplitude across one symbol interval, calculated by formula (3):

$$\lambda = \frac{\int_{-\Delta}^{0} |r(t + t_s)| dt}{\int_{-\Delta}^{0} |r(t)| dt} \quad (3)$$

The output from multiplier 112 and the output signal from phase angle calculating section 106 are input to a polar coordinate-to-rectangular coordinate converter 113, where the signal is converted into a complex number representing variation in amplitude and phase and this will be output from an estimate value output terminal 114.

Figure 8:
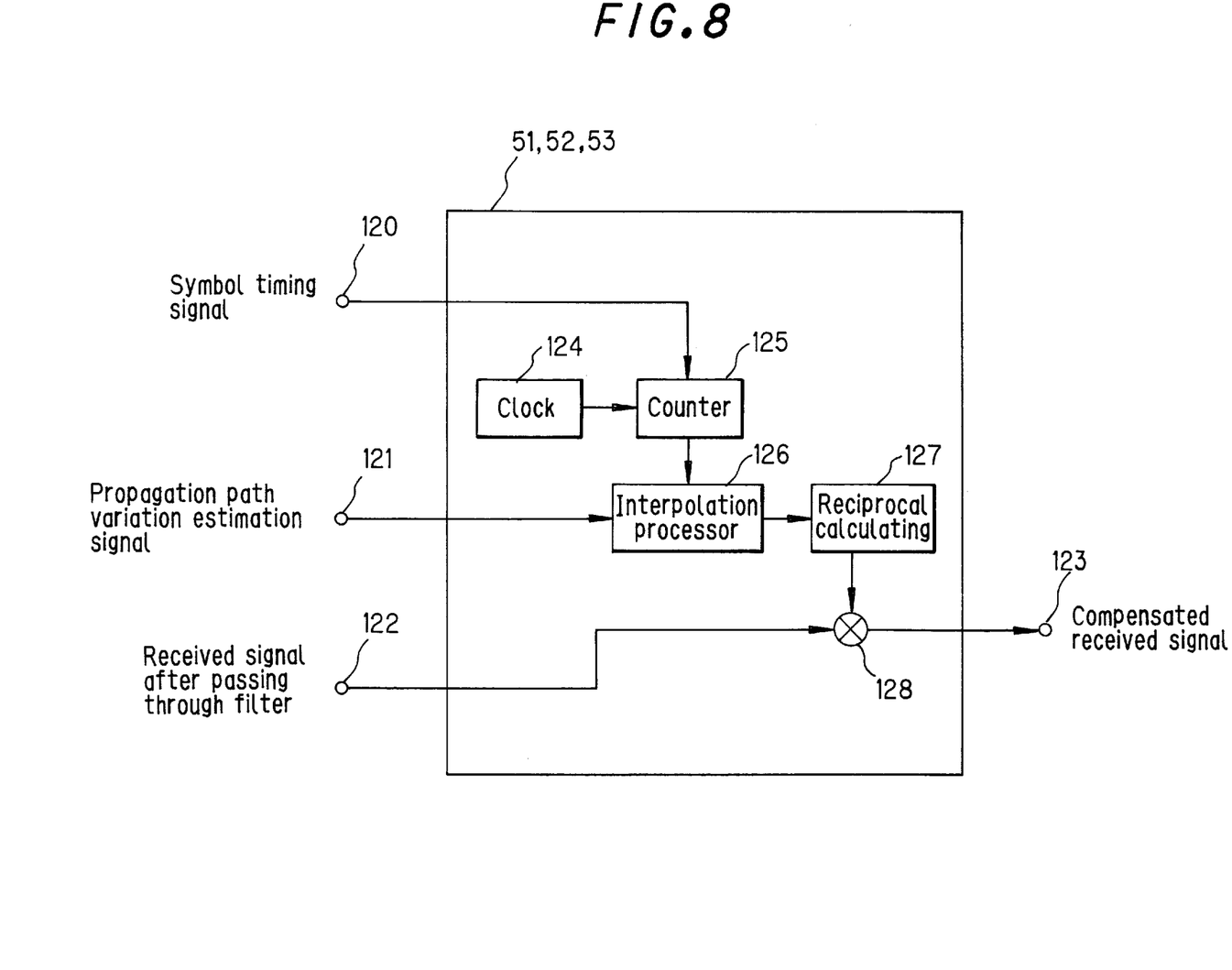
FIG. 8 is a block diagram showing the configuration of a propagation path variation compensator of the invention.

FIG. 8 shows a propagating path variation compensating circuit used in this invention. The timing signal input from symbol timing signal input terminal 120 is supplied together with a clock pulse signal generated from a sampling clock oscillator 124 to a counter 125.

In counter 125, a timing signal which will be reset by the symbol timing signal is generated. The output signal from counter 125 is input to interpolation calculating section 126. The estimate value of the propagation path variation during interval $t_s$, supplied from a propagation path variation estimate signal input terminal 121 is supplied to interpolation calculating section 126. In interpolation calculating section 126, the interpolating calculation is made following formula (4), so as to determine the estimate value of the variation in amplitude and phase caused by the propagation path within symbol interval.

$$\hat{\lambda}(t) = \frac{1-t}{t_s} + \lambda \frac{t}{t_s} \quad (4)$$

The estimate of the propagation path variation determined by formula (4) is input to a reciprocal calculating section 127 where its reciprocal is determined. The output signal from reciprocal calculating section 127 is input together with the received signal from a received signal input terminal 122 to a multiplier 128 and multiplication is performed. The multiplier output signal is output from a compensated signal output terminal 123.

Figure 9:
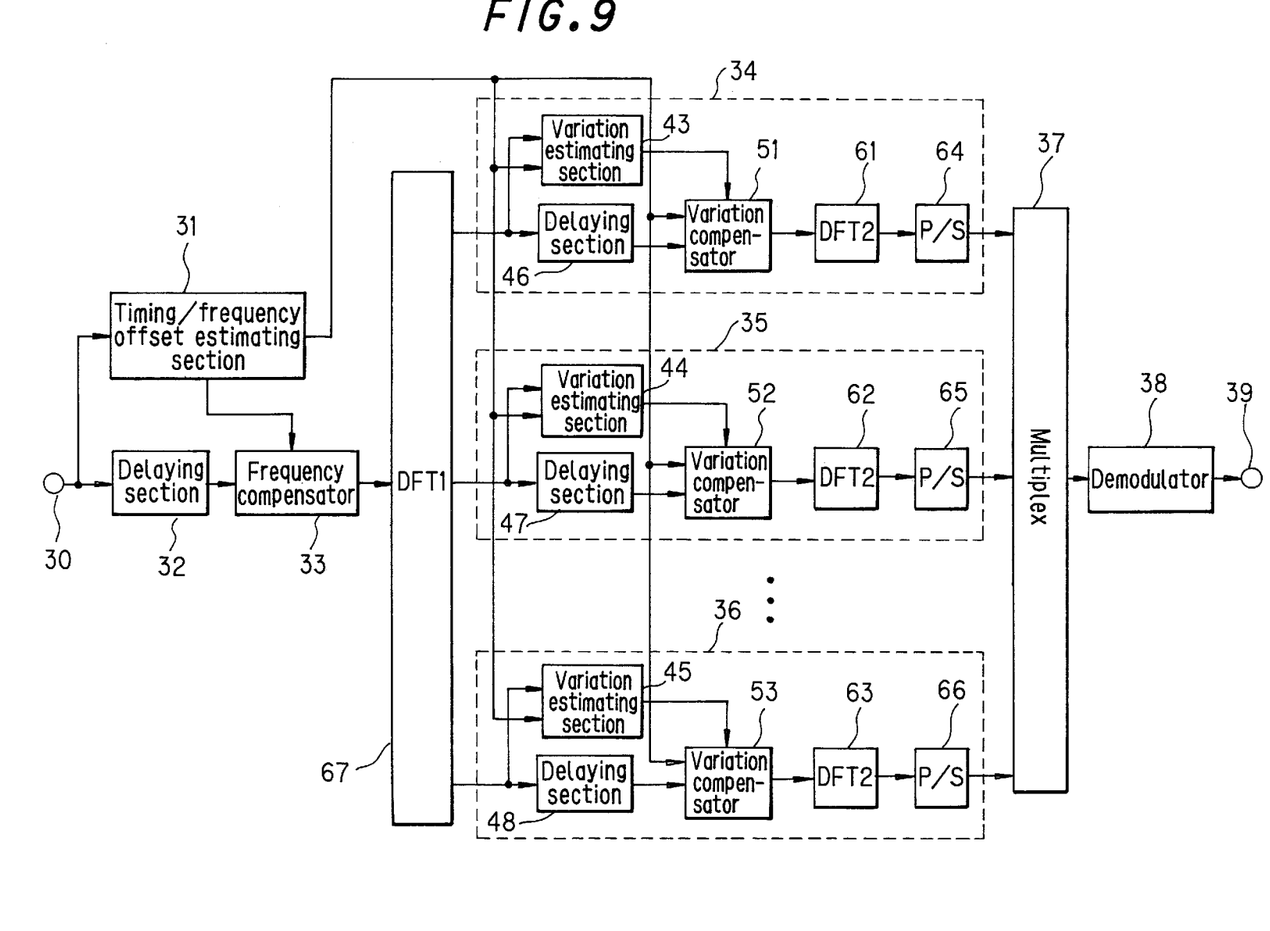
FIG. 9 is a block diagram showing the configuration of a receiver in the second embodiment of the invention.

FIG. 9 is another embodiment of the invention and its operation will be described hereinbelow using this figure. In this figure, the received signal being input from input terminal 30 is supplied to timing/frequency offset estimating section 31 and delaying section 32.

Timing/frequency offset estimating section 31, estimates the symbol timing and the frequency offset. Delaying section 32 in FIG. 9 delays the received signal by the time required for the estimation of the timing and frequency offset to supply it to frequency compensator 33. Frequency compensator 33 compensates the frequency offset based on the estimate of the frequency offset estimated in timing/frequency offset estimating section 31.

The compensation of the frequency offset here is performed for only the off set of fixed frequency between the transmitter and receiver. The received signal with its frequency offset compensated is supplied to a DFT 67 and divided into n number of bands. The signals divided by DFT 67 are input to variation estimating sections 43, 44 and 45 as well as delaying sections 46, 47 and 48. The variation estimating section estimates time-dependent variations in the phasing propagation path.

The delaying sections delay the signals by the time required for the estimation and input the signals to variation compensators 51, 52 and 53, respectively. Variation compensators 51, 52 and 53 compensate the time-dependent variations in the signals based on the estimated variations in the propagation path. The signal after compensation is divided into subchannel signals in discrete Fourier transformers 61, 62 and 63, and then these signals are converted into serial data in parallel-to-serial converters 64, 65 and 66, and then multiplexed in multiplexing circuit 37. The multiplexed signal obtained from multiplexing circuit 37 is determined and demodulated in a demodulator 38 so as to reproduce the transmitted data. The data stream is output from output terminal 39.

Figure 10:
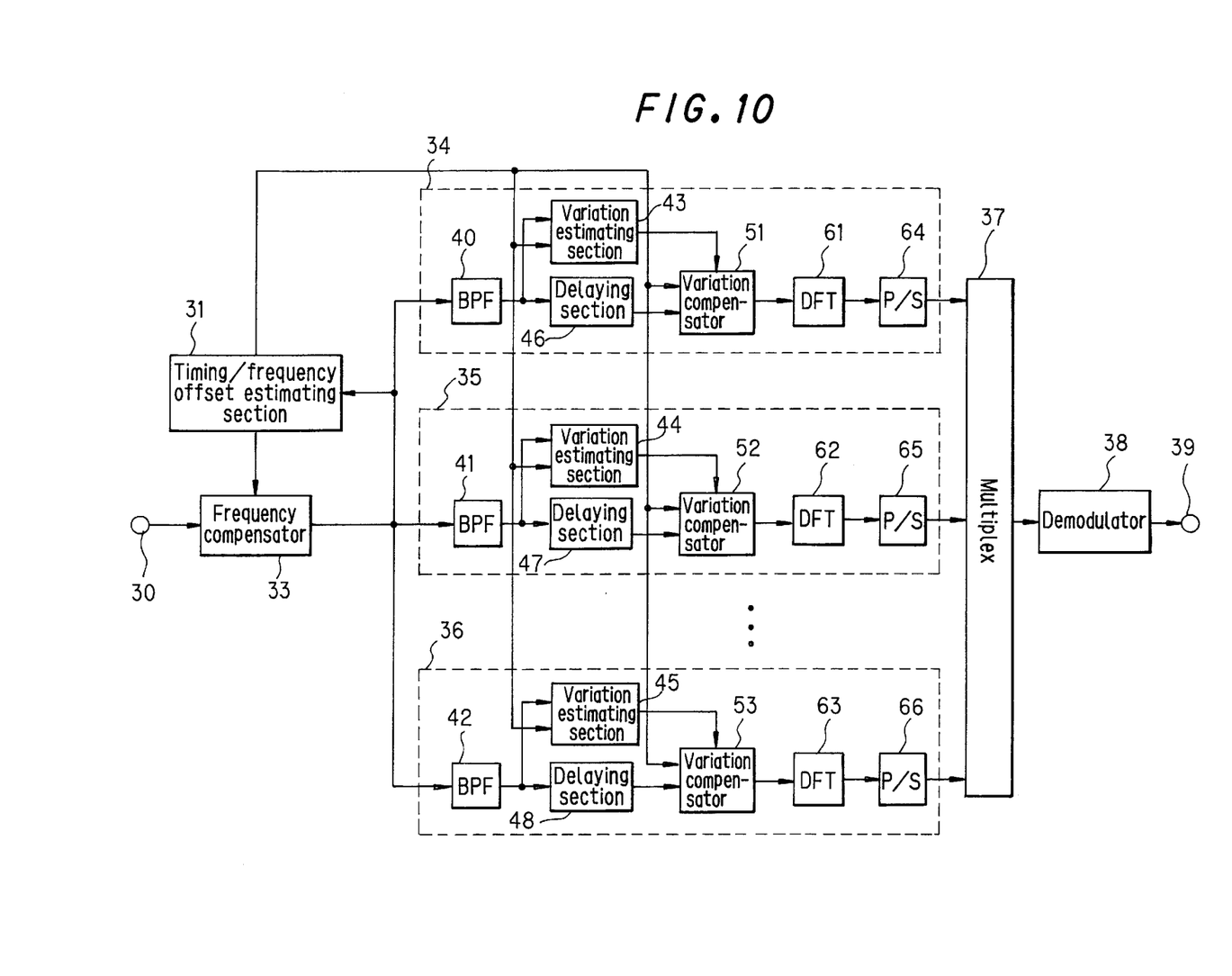
FIG. 10 is a block diagram showing the configuration of a receiver in the third embodiment of the invention.

FIG. 10 shows another mode of the embodiment of the invention. Referring to FIG. 10, the operation will be described hereinbelow. In this figure, the received signal being input from input terminal 30 is supplied to frequency compensator 33. The output from frequency compensator 33 is input to timing/frequency offset estimating section 31 and band-pass filters (BPF) 40, 41 and 42.

Timing/frequency offset estimating section 32 estimates symbol timing and frequency offset. Frequency compensator 33 compensates frequency offset based on the estimate value of frequency offset estimated in timing/frequency offset estimating section 31 (feedback technique).

The compensation of the frequency offset here is performed for only the offset of fixed frequency between the transmitter and receiver. The operation following are the same as in the embodiment shown in FIG. 3.

As has been described, in accordance with the invention, the frequency offset section can be performed based on either feed forward or feedback technique.

The invention should not be limited to the above embodiments and can be changed or modified by combinations etc. without departing from the scope and spirit of the invention.

Thus, in accordance with the invention, even if the multi-frequency quadrature modulated signal rapidly varies in amplitude and phase through multi-pass phasing propagation path, it is possible to compensate the variation. As a result, this invention contributes to suppress the degradation of the transmission characteristics due to a propagation path variation.

In particular, in this invention, when the signal is affected not only by the time-dependent variation in amplitude and phase due to uniform phasing but also affected due to frequency selective phasing and hence the amplitude and phase vary differently for individual frequencies, it is possible to compensate the variation.

Thus, even when the signal needs to be-received while the receiver is moving, it is possible to reproduce the signal in an improved condition.

What is claimed is:

1. A multi-frequency quadrature modulated signal demodulator for demodulating a received multi-frequency quadrature modulated signal, comprising:

frequency offset estimating means for estimating an average frequency offset with respect to an entire frequency band of the multi-frequency quadrature modulated signal;

frequency offset compensating means for compensating a frequency offset of the multi-frequency quadrature modulated signal based on the average frequency offset estimated by said frequency offset estimating means;

a band filter set for dividing the multi-frequency quadrature modulated signal, of which the frequency offset has been compensated by said frequency offset compensating means, into different divided frequency components;

propagation path variation estimating means for estimating an amount of propagation path variation of each of the divided frequency components which have been obtained from said band filter set;

propagation path variation compensating means, for compensating the propagation path variation of each of the divided frequency components based on the amount of propagation path variation estimated by said propagation path variation estimating means;

multiplexing means for multiplexing each compensated divided frequency component output by said propagation path variation compensating means; and decoding means, for decoding an output from said multiplexing means, to provide a demodulated multi-frequency quadrature signal.

2. The multi-frequency quadrature modulated signal demodulator according to claim 1, wherein for each divided frequency component, said propagation path variation estimating means comprises:

delaying means for delaying a divided frequency component output from said band filter set;

complex conjugate calculating means for calculating a complex conjugate signal of an output of said delaying means;

multiplying means for multiplying the divided frequency component output from said band filter set and an output signal of said complex conjugate calculating means;

divisional calculating means for divisionally calculating the divided frequency component output from said band filter set by an output signal of said delaying means; and coordinate converter means for obtaining an estimated value of amplitude and a variation in phase with respect to time of the divided frequency component output from said band filter set, based on an output signal of said multiplying means and an output signal of said divisional calculating means, to provide an estimated amount of propagation path variation of the divided frequency component.

3. The multi-frequency quadrature modulated signal demodulator according to claim 1, wherein for each divided frequency component, said propagation path variation compensating means comprises:

interpolation operating means for obtaining an estimated value of propagation path variation for data across a symbol interval by performing an interpolation operation on an estimated amount of propagation path variation estimated by said propagation path variation estimating means; and divisional calculating means for divisionally calculating a compensated divided frequency component using a divided frequency component output from said band filter set and the estimated value of propagation path variation output from said interpolation operating means.

4. A method of multi-frequency quadrature demodulation comprising the steps of:

estimating an average frequency offset with respect to an entire frequency band of a received multi-frequency quadrature modulated signal;

compensating a frequency offset of the received multi-frequency quadrature modulated signal based on the estimated average frequency offset;

dividing the frequency compensated multi-frequency quadrature modulated signal into different divided frequency components;

estimating an amount of propagation path variation of each of the divided frequency components;

compensating the propagation path variation of each of the divided frequency components based on the estimated amount of propagation path variation;

multiplexing each compensated divided frequency component to provide a multiplexed signal; and decoding the multiplexed signal to provide a demodulated multi-frequency quadrature signal.

5. The method of multi-frequency quadrature demodulation of claim 4, wherein said step of estimating an amount of propagation path variation of each of the divided frequency components respectively comprises the steps of:

delaying a divided frequency component to provide a delayed frequency component;

determining a complex conjugate of the delayed frequency component;

multiplying the divided frequency component and the complex conjugate of the delayed frequency component to provide a multiplied signal;

divisionally calculating the divided frequency component with the delayed frequency component to provide a reciprocal output; and obtaining an estimated value of amplitude and a variation in phase with respect to time of the divided frequency component, based on the multiplied signal and the reciprocal signal, as an estimated amount of propagation path variation of the divided frequency component.

6. The method of multi-frequency quadrature demodulation of claim 4, wherein said step of compensating the propagation path variation of each of the divided frequency components comprises the steps of:

obtaining an estimated value of propagation path variation for data across a symbol interval by performing an interpolation operation on an estimated amount of propagation path variation; and divisionally calculating a compensated divided frequency component using a divided frequency component and the estimated value of propagation path variation.

7. A multi-frequency quadrature modulated signal demodulator for demodulating a received multi-frequency quadrature modulated signal, comprising:

a frequency estimator for estimating an average frequency offset with respect to an entire frequency band of the multi-frequency quadrature modulated signal;

a frequency offset compensator for compensating a frequency offset of the multi-frequency quadrature modulated signal based on the average frequency offset estimated by said frequency offset estimator;

a band filter set for dividing the multi-frequency quadrature modulated signal, of which the frequency offset has been compensated by said frequency offset compensator, into different divided frequency components;

a propagation path variation estimator for estimating an amount of propagation path variation of each of the divided frequency components which have been obtained from said band filter set;

a propagation path variation compensator, for compensating the propagation path variation of each of the divided frequency components based on the amount of propagation path variation estimated by said propagation path variation estimator;

a multiplexer for multiplexing each compensated divided frequency component output by said propagation path variation compensator; and a decoder, for decoding an output from said multiplexer, to provide a demodulated multi-frequency quadrature signal.

8. The multi-frequency quadrature modulated signal demodulator according to claim 7, wherein for each divided frequency component, said propagation path variation estimator comprises:

a delay for delaying a divided frequency component output from said filter set;

a complex conjugate calculator for calculating a complex conjugate signal of an output of said delay;

a multiplier for multiplying the divided frequency component output from said band filter set and an output signal of said complex conjugate calculator;

a divisional calculator for divisionally calculating the divided frequency component output from said band filter set by an output signal of said delay; and a coordinate converter for obtaining an estimated value of amplitude and a variation in phase with respect to time of the divided frequency component output from said band filter set, based on an output signal of said multiplier and an output signal of said divisional calculator, to provide an estimated amount of propagation path variation of the divided frequency component.

9. The multi-frequency quadrature modulated signal demodulator according to claim 7, wherein for each divided frequency component, said propagation path variation compensator comprises:

an interpolation operator for obtaining an estimated value of propagation path variation for data across a symbol interval by performing an interpolation operation on an estimated amount of propagation path variation estimated by said propagation path variation estimator; and a divisional calculator for divisionally calculating a compensated divided frequency component using a divided frequency component output from said band filter set and the estimated value of propagation path variation output from said interpolation operator.

* * * * *